(12) United States Patent
Scarlata (10) Patent No.: US 10,681,874 B1
(45) Date of Patent: Jun. 16, 2020

(54) TREE INJECTION APPARATUS AND TREATMENT SYSTEM

(71) Applicant: James Scarlata Consulting Forester, LLC, Manistee, MI (US)

(72) Inventor: James Scarlata, Manistee, MI (US)

(73) Assignee: James Scarlata Consulting Forester, LLC, Manistee, MI (US)

( * ) Notice: Subject to any disclaimer, the term of this patent is extended or adjusted under 35 U.S.C. 154(b) by 275 days.

(21) Appl. No.: 15/919,797

(22) Filed: Mar. 13, 2018

Related U.S. Application Data (60) Provisional application No. 62/472,759, filed on Mar. 17, 2017.

(51) Int. Cl.
  *A01G 7/06* (2006.01)
  *F04B 23/02* (2006.01)

(52) U.S. Cl.
  CPC .............. *A01G 7/06* (2013.01); *F04B 23/025* (2013.01); *F04B 2205/01* (2013.01)

(58) Field of Classification Search
  CPC ........................................................ A01G 7/06
  USPC ......................................................... 47/57.5
  See application file for complete search history.

(56) References Cited

U.S. PATENT DOCUMENTS

| 1,756,453 | A | 4/1930 | Davey et al. |
| 2,796,701 | A | 6/1957 | Mauget |
| 3,130,519 | A | 4/1964 | Mauget |
| 3,254,449 | A | 6/1966 | Mauget |
| 3,286,401 | A | 11/1966 | Mauget |
| 3,290,822 | A | 12/1966 | Mauget |
| 3,304,655 | A | 2/1967 | Mauget |
| 3,706,161 | A | 12/1972 | Jenson |
| 3,832,803 | A | 9/1974 | Blake et al. |
| 3,992,813 | A | 11/1976 | Freshel |
| 4,011,685 | A | 3/1977 | Boyd et al. |
| 4,103,459 | A | 8/1978 | Hendrixson et al. |
| 4,176,495 | A | 12/1979 | Dale |
| 4,308,689 | A | 1/1982 | Jenson et al. |
| 4,342,176 | A | 8/1982 | Wolfe |
| 4,365,440 | A | 12/1982 | Lenardson |

(Continued)

FOREIGN PATENT DOCUMENTS

| CN | 101263816 B | 7/2010 |
| GB | 2487721 | 8/2012 |

(Continued)

*Primary Examiner* — Monica L Williams
(74) *Attorney, Agent, or Firm* — Gardner Linn (57) ABSTRACT

A tree injection apparatus includes a pump coupled with a fluid reservoir that holds a treatment solution under pressure generated by the pump. At least one fluid conduit is provided to have a first end coupled with the pump and a second end coupled with a valve assembly. A feeder tube is releasably engaged at the valve assembly, where the feeder tube is configured to engage a drilled hole extending into vascular tissue of the tree receiving treatment. The pump releases the pressurized treatment solution through the fluid conduit and to the feeder tube at a desired pressure, so as to generally coincide with the absorption rate of the vascular tissue. The feeder tube may be released from engagement with the valve assembly, so as to allow cleaning of the feeder tube of debris, pathogens, and spores before being installed on another tree.

18 Claims, 9 Drawing Sheets

(56) References Cited

U.S. PATENT DOCUMENTS

| | | | |
|---|---|---|---|
| 4,505,067 A * | 3/1985 | Gillespie | A01G 7/06 47/57.5 |
| 5,086,584 A | 2/1992 | Merving | |
| 5,239,773 A | 8/1993 | Doolittle, Jr. | |
| 5,287,992 A | 2/1994 | Merving | |
| 5,355,619 A | 10/1994 | West et al. | |
| 5,443,641 A | 8/1995 | Helsing et al. | |
| 5,553,416 A | 9/1996 | Jasso, Jr. | |
| 5,596,837 A | 1/1997 | Duff | |
| 5,797,215 A | 8/1998 | Doolittle et al. | |
| 5,802,996 A | 9/1998 | Baxter | |
| 5,901,498 A | 5/1999 | Higgins | |
| 5,956,894 A * | 9/1999 | Eldridge | A01G 7/06 47/57.5 |
| 6,032,411 A | 3/2000 | Foust | |
| 6,216,388 B1 | 4/2001 | Miller et al. | |
| 6,311,429 B1 | 11/2001 | Wolfe | |
| 6,387,388 B1 | 5/2002 | Misselbrook et al. | |
| 6,405,480 B1 | 6/2002 | Martin | |
| 6,789,354 B2 | 9/2004 | Wells | |
| 6,988,333 B2 | 1/2006 | Fraedrich et al. | |
| 7,114,289 B2 | 10/2006 | Black et al. | |
| 7,178,286 B1 | 2/2007 | Doolittle | |
| 7,805,884 B2 | 10/2010 | Burgess | |
| 8,633,167 B2 | 1/2014 | Grosman et al. | |
| 8,677,684 B1 | 3/2014 | Doolittle et al. | |
| 8,726,567 B1 * | 5/2014 | Pishdadian | A01G 7/06 47/57.5 |
| 2002/0046486 A1 | 4/2002 | Wild et al. | |
| 2004/0025420 A1 | 2/2004 | Wild et al. | |
| 2004/0079169 A1 * | 4/2004 | Wild | A01G 7/06 73/861 |
| 2005/0050795 A1 * | 3/2005 | Fraedrich | A01G 7/06 47/57.5 |
| 2005/0166450 A1 | 8/2005 | Wild et al. | |
| 2007/0267066 A1 * | 11/2007 | Hemo | A01G 7/06 137/343 |
| 2008/0276534 A1 | 11/2008 | Bissonnette et al. | |
| 2011/0021353 A1 | 1/2011 | Doolittle, Jr. | |
| 2013/0042526 A1 | 2/2013 | Doolittle | |
| 2013/0195946 A1 | 8/2013 | Stamper et al. | |
| 2013/0326944 A1 * | 12/2013 | Obrist | A01G 7/06 47/57.5 |
| 2014/0345194 A1 * | 11/2014 | Vue | A01G 7/06 47/57.5 |
| 2015/0351327 A1 | 12/2015 | Davis, Jr. | |
| 2016/0057996 A1 | 3/2016 | Dominani et al. | |
| 2016/0360709 A1 | 12/2016 | Shang et al. | |
| 2017/0231165 A1 * | 8/2017 | Bird | A01G 7/06 47/8 |

FOREIGN PATENT DOCUMENTS

| | | |
|---|---|---|
| WO | 2012114197 A2 | 8/2012 |
| WO | 2016029859 A1 | 3/2016 |

* cited by examiner

TREE INJECTION APPARATUS AND TREATMENT SYSTEM

CROSS REFERENCE TO RELATED APPLICATION

The present application claims the benefit of U.S. provisional application Ser. No. 62/472,759, filed Mar. 17, 2017, which is hereby incorporated herein by reference in its entirety.

FIELD OF THE INVENTION

The present invention relates generally to apparatuses used to inject liquids into trees and, more particularly, to an injection apparatus that injects a pressurized liquid treatment solution into a tree or other wooded plant.

BACKGROUND OF THE INVENTION

It is generally known to inject a tree with fertilizers, insecticides, fungicides, and the like to treat the tree for related disease and other issues. Such injection methods can be beneficial to directly introduce a treatment solution into the circulatory system of the tree and thereby reduce dilution and/or poor absorption of the solution, as can be a common issue when otherwise externally introducing the solution to the tree, such as by spraying or other form of topical application, or introducing the solution to the surrounding soil.

SUMMARY OF THE PRESENT INVENTION

The present invention provides a tree injection apparatus, system, and method of treating a tree for a disease, fungus, insects, or other issue negatively affecting the tree. In accordance with one aspect of the present invention, the injection apparatus includes a pump device coupled with a fluid reservoir that holds a treatment solution under pressure generated by the pump device. A flexible fluid conduit has a first end coupled with the pump device and a second end coupled with a valve assembly. A feeder tube is releasably engaged at the valve assembly, and is configured to engage a drilled hole extending into vascular tissue of the tree receiving treatment. The pump device releases the pressurized treatment solution through the flexible conduit and the feeder tube at a desired pressure, so as to generally coincide with the absorption rate of the vascular tissue. When the injection treatment is completed for a tree, the valve assembly may be moved to a closed position and the feeder tube may be released from engagement with the valve assembly, so as to expose a substantially linear interior channel of the feeder tube that can then readily be cleaned of debris, pathogens, and spores before being installed on another tree. This can reduce the spread of disease or fungus spores, such as when treating multiple trees with the same equipment, especially when such disease or fungus is not previously detected or when treating trees with more threatening and easily communicable diseases like oak wilt, lethal yellowing, and the like.

In accordance with another aspect of the present invention, a method of treating a tree is provided where a plurality of holes are drilled or formed in exposed roots of a tree, such as in buttress roots spaced around a base of the tree. A feeder tube is engaged or inserted into each of the plurality of drilled holes to extend into vascular tissue of the tree. A desired pressure is generated in a fluid reservoir containing a liquid treatment solution with the use of a pump device coupled with the fluid reservoir. The pressurized treatment solution is released from the fluid reservoir to a flexible fluid conduit that extends to a valve assembly attached at each of the feeder tubes. Prior to releasing the pressurized treatment solution through the feeder tube to the vascular tissue of the tree, air may be released or bled from the flexible conduit at the valve assembly to limit or prevent air from being injected into the tree, which can be harmful and cause damage to the circulatory system of the tree. Also, before engaging the feeder tubes in another tree, a substantially linear interior channel of each feeder tube may be exposed to be cleaned of debris, pathogens, and spores by releasing the feeder tube from engagement with the valve assembly.

These and other objects, advantages, purposes, and features of the present invention will become apparent upon review of the following specification in conjunction with the drawings.

DETAILED DESCRIPTION OF EMBODIMENTS

Figure 10:
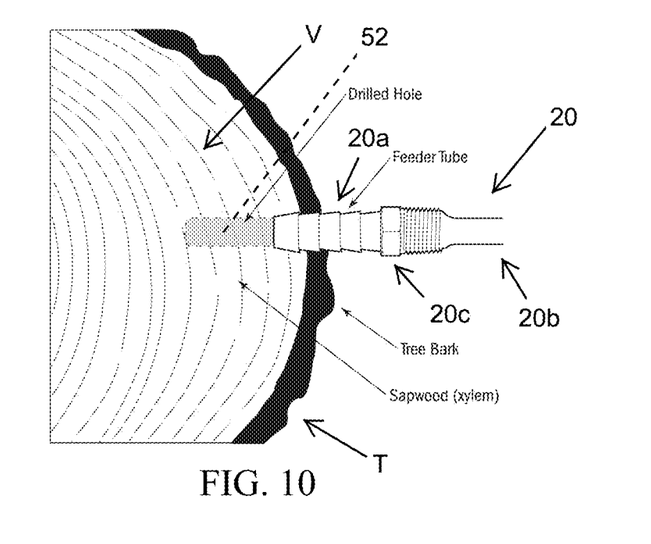
FIG. 10 is a cross-sectional view of a feeder tube of the tree injection apparatus shown in FIG. 1 is being inserted into a hole that is drilled to extend into sapwood of the tree.

Referring now to the drawings and the illustrative embodiments depicted therein, a tree injection apparatus 10 (FIG. 1) is provided for treating a tree T (FIG. 11) or other wooded plant that has a disease, fungus, insects, or other issue negatively affecting the health of the tree or plant. The injection apparatus 10 includes a pump device 12 that is coupled with a fluid reservoir 14 for holding a treatment solution under pressure generated by the pump device 12. At least one flexible fluid conduit 16 is provided with a first end coupled with the pump device 12 and a second end coupled with a valve assembly 18. A feeder tube 20 is releasably engaged at the valve assembly 18, where the feeder tube 20 is configured to engage a drilled hole 52 extending into vascular tissue V or sapwood or xylem of the tree T receiving treatment, such as shown in FIG. 10. The pump device 12 is configured to release the pressurized treatment solution through the flexible conduit 16 and to the feeder tube 20 at a desired pressure, so as to generally coincide with the absorption rate of the vascular tissue V. Over pressurization is generally to be avoided because it can lead to bulging of the tree at the injection site and related damage to the vascular tissue, among other inefficiencies in treating the underlying issue affecting the tree.

Figure 1:
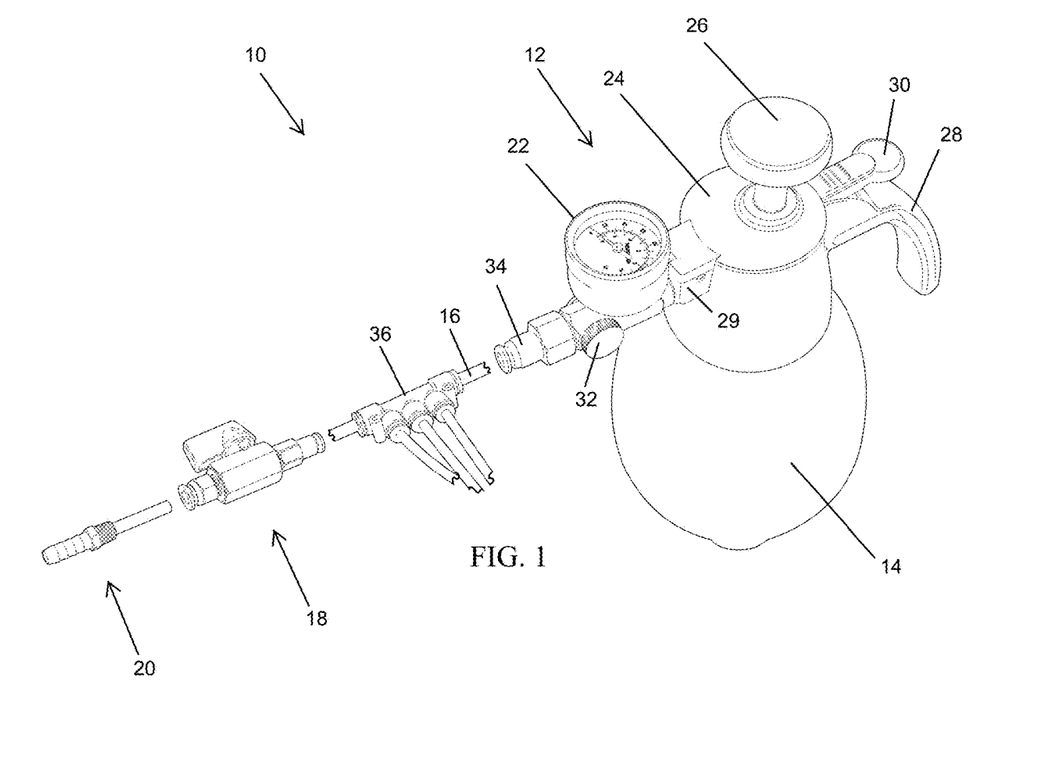
FIG. 1 is a partially exploded, upper perspective view of a tree injection apparatus in accordance with the present invention, showing sections of the flexible conduit removed for purposes of illustration.
Figure 2:
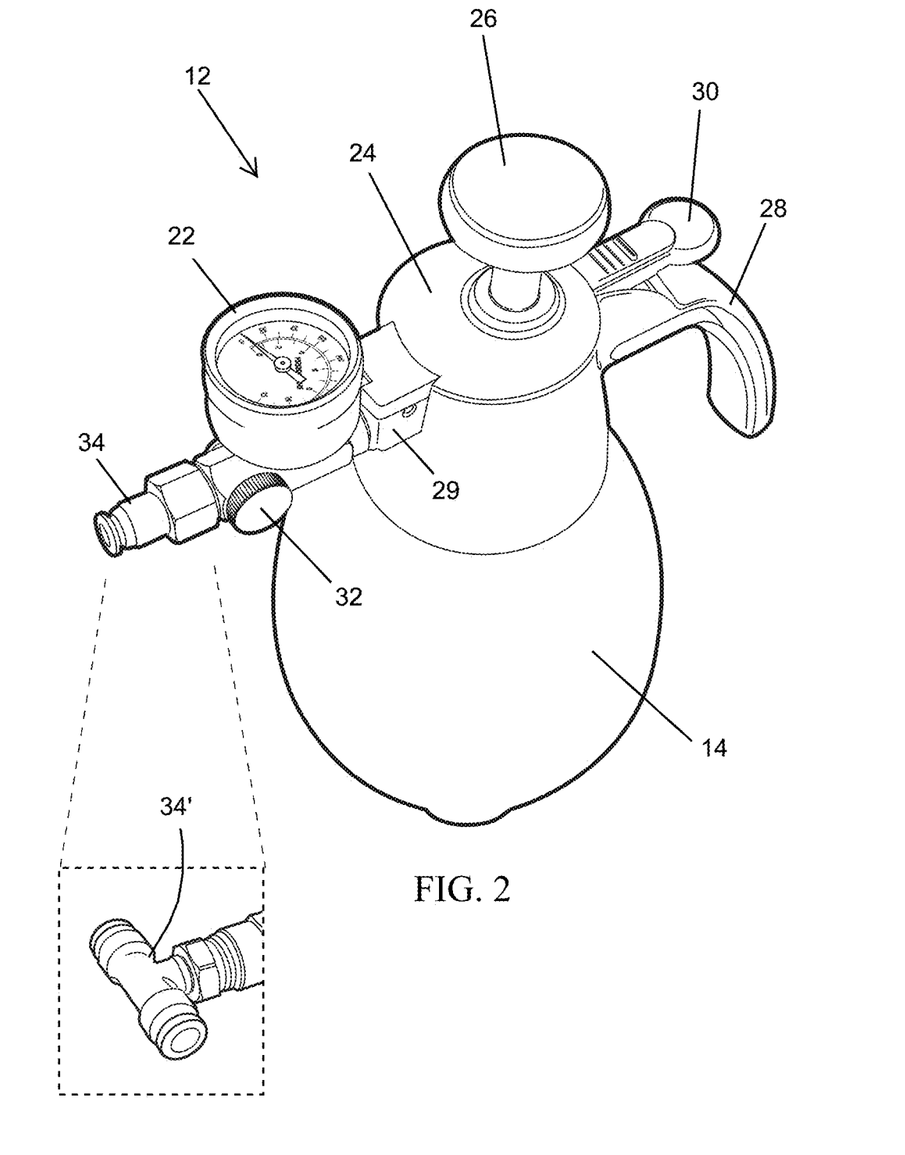
FIG. 2 is an upper perspective view of a portable pump device attached to a fluid reservoir of the tree injection apparatus shown in FIG. 1.
Figure 8:
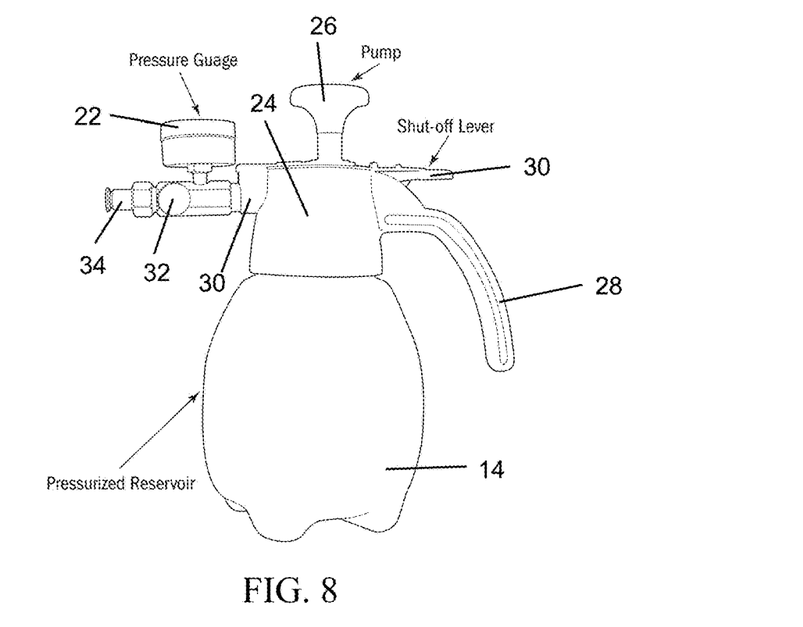
FIG. 8 is an elevational view of the portable pump device and the fluid reservoir shown in FIG. 4.

To regulate and monitor the pressure of the treatment solution, the pump device 12 may include a combination regulator and pressure gauge 22, such as shown in FIGS. 1, 2 and 8, for a user to visually monitor and adjust the pressure of the treatment solution so that the desired pressure remains generally constant as the fluid is delivered to the tree. Optionally, when a pressure regulator is provided, two pressure gauges may be provided, including an upstream pressure gauge displaying the non-regulated pressure of the fluid reservoir 14 and a downstream pressure gauge displaying the regulated pressure in the flexible conduit 16. However, it will be appreciated that a user operating the injection apparatus 10 would be able to monitor a single gauge 22 displaying pressure in the fluid reservoir 14 and manually maintain the pressure within a desired range by manually operating the pump device 12 as needed. The desired pressure is preferably less than about 30 psi, and more preferably between about 15 and about 25 psi. Further, the desired pressure may be variable, as it may be desired to start with a low pressure, such as about 15 psi, and then slowly increase the pressure as the tree vascular system pores open and allow for a faster absorption rate.

As also shown in FIGS. 1, 2 and 8, the pump device 12 includes a cover module 24 that attaches over the top opening of the fluid reservoir 14, such as via a threaded connection that may include a gasket or the like to assist in forming a seal between the cover module 24 and the fluid reservoir. The fluid reservoir may comprise an at least partially translucent polymer material to allow for visual monitoring of the remaining treatment solution and may be provided as a variety of differently shaped fluid holding containers. The cover module 24 also includes a manually operable plunger 26 that, when moved in a reciprocating up and down motion, gradually increases the pressure within the fluid reservoir 14. It is conceivable that the pump device 12 may include alternative types of pumps, such as rotary pumps and electrically operated pumps, and further the pressure gauge or sensor may alternatively provide an electronic reading to a remote electronic device, such as to allow for remote monitoring and/or adjustment of the pressure of the treatment solution.

With further reference to FIGS. 1, 2 and 8, the pump device 12 may be provided with a handle 28 for a user to more easily carry and move the pump device 12 and the attached fluid reservoir 14, such as with a single hand, while setting up the injection apparatus 10 at a tree or while adjusting the reservoir pressure with the plunger 26. The handle 28 is disposed at a side of the cover module 24 opposite the outlet 29 that attaches to the pressure gauge 22. However, in additional embodiments, the handle may be disposed in various other configurations on the pump device and/or the fluid reservoir. As shown in FIGS. 1, 2 and 8, the pump device 12 also includes a reservoir valve having a thumb lever 30 protruding from above the handle 28 that is manually movable to open the reservoir valve for releasing the pressurized treatment solution to the flexible conduit 16. When the injection apparatus 10 is installed at a tree and/or the fluid reservoir is pressurized to a desired level, the lever 30 is configured to be held in a locked position with the reservoir valve open. Further, a rotatable valve 32 may be provided downstream of the pressure gauge 22 to further regulate the flow of the treatment solution, such that when the rotatable valve 32 is in a closed position, the pressure gauge 22 may be read prior to moving the rotatable valve 32 to an open position to release the treatment solution to the flexible conduit 16.

Figure 7:
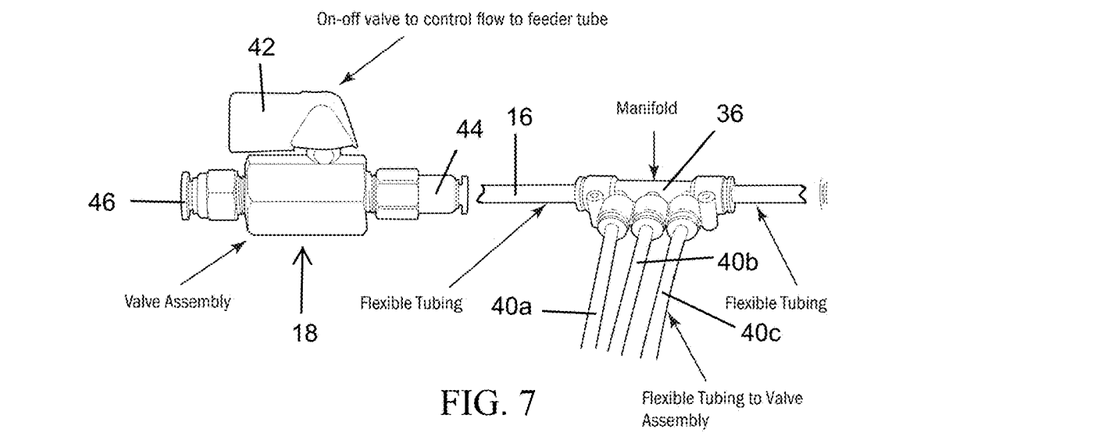
FIG. 7 is an elevational view of a valve assembly and a manifold having additional sections of flexible tubing, as provided in the tree injection apparatus shown in FIG. 1.
Figure 11:
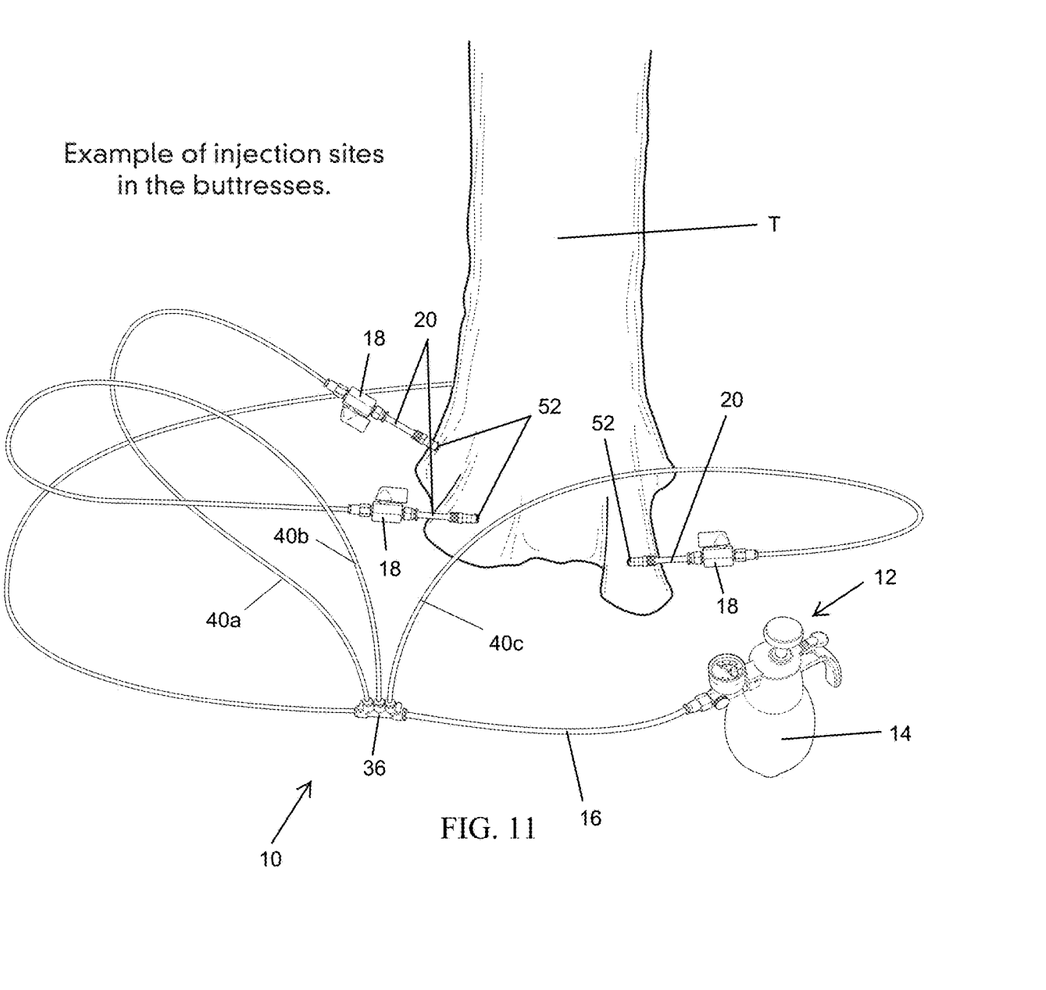
FIG. 11 is a perspective view of the tree injection apparatus shown in FIG. 1 with the feeder tubes engaged at injection site in buttresses of a tree.
Figure 11A:
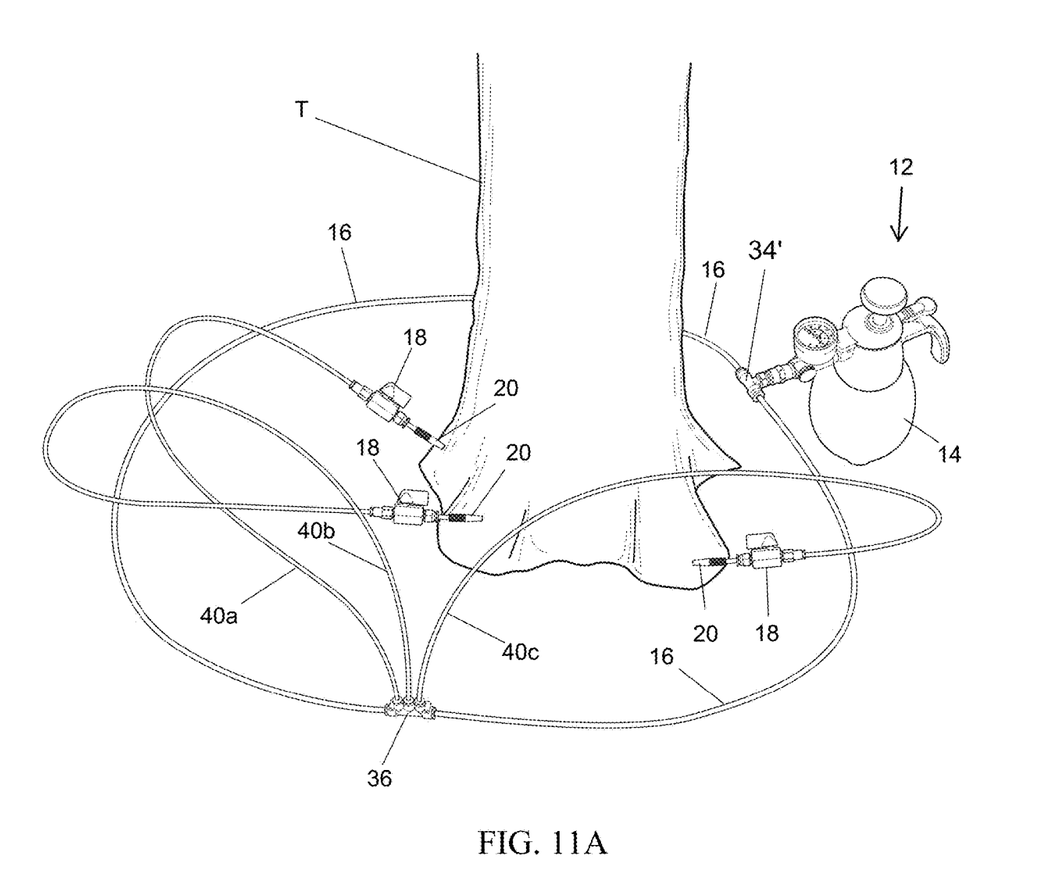
FIG. 11A is a perspective view of the tree injection apparatus shown fitted with a T-connector.

The flexible conduit 16, as shown in FIG. 1, is attached at a releasable connector 34, such as a push-to-connect pneumatic fitting, which is located at the outlet of the rotatable valve 32. Optionally, and as shown in an inset drawing of FIG. 2, the releasable connector may be configured as a T-connector 34' having two outlet fittings, which facilitates routing tubing in two directions around a tree T, such as shown in FIG. 11A. The flexible conduit 16 may comprises a nylon or polyethylene tube that is substantially translucent to allow for visual inspection to see if the treatment solution is properly flowing through the flexible conduit 16. For example, a water-soluble dye can be used in the treatment solution mixture to make it easier to see the liquid in the conduit or tubes. It is appreciated that other types of tubing or rigid conduit may also be used within the scope of the present invention. The flexible conduit 16 is configured to deliver the liquid treatment solution to each desired injection site at the tree. As such, in cases when multiple injection sites are desired, the flexible conduit 16 may be provided with additional tube sections that lead to additional feeder tube connections installed at the tree (FIG. 11), such as by attaching a manifold 36 (FIG. 3) at an intermediate section of the flexible conduit 16. The manifold 36 may be disposed at an end of the flexible conduit 16 away from the pump device 12 or at an intermediate section of the flexible conduit 16, such as at a location between the pump device 12 and the valve assembly 18, as shown in FIGS. 1, 7 and 11.

Figure 3:
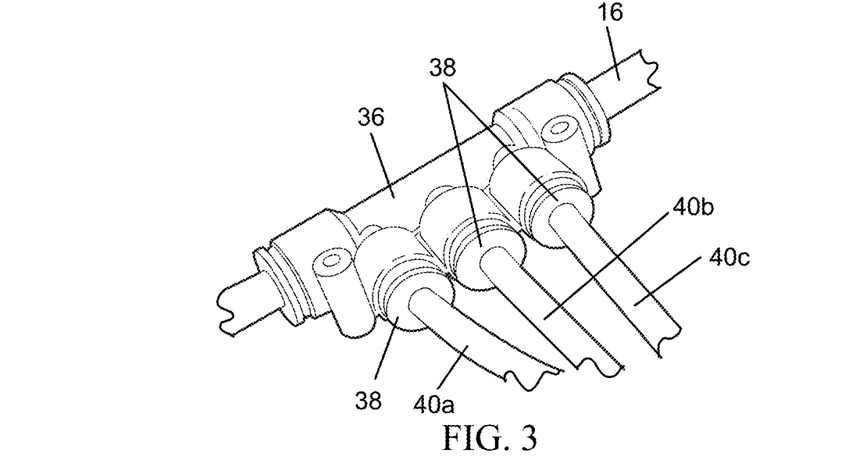
FIG. 3 is an enlarged upper perspective view of a manifold having additional sections of flexible tubing connected with an intermediate portion of the flexible conduit, as provided in the tree injection apparatus shown in FIG. 1.

The manifold 36 provides at least one connection port 38 for engaging an additional section of flexible tubing. As shown in FIG. 3, the manifold 36 provides three connection ports 38 that each provide a releasable connector, such as a push-to-connect pneumatic fitting, for engaging the additional sections of tubing 40a, 40b, 40c. Each of the additional section of tubing 40a, 40b 40c has a generally equal diameter, such as about 4 mm, which in the illustrated embodiment is slightly less that the diameter of the portion of the flexible conduit 16 that attaches at the pump device 12, such as about 6 mm. The manifold 36, thus, effectively acts as a splitter to allow the treatment solution to be dispersed to multiple injection sites on a tree, such as shown in FIG. 11. In the additional embodiment illustrated in FIG. 12, two manifolds 136 are provided to allow the injection apparatus 110 to be adapted to treat a tree having a larger diameter and/or to provide additional desired injection sites from that shown in FIG. 11.

Figure 4:
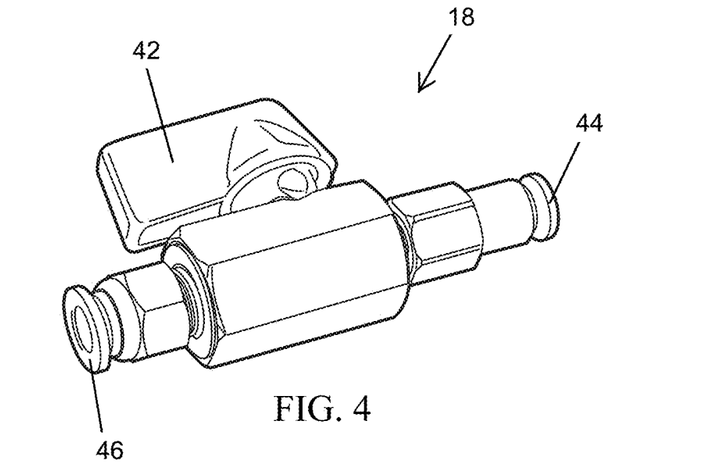
FIG. 4 is an enlarged upper perspective view of a valve assembly of the tree injection apparatus shown in FIG. 1.
Figure 5:
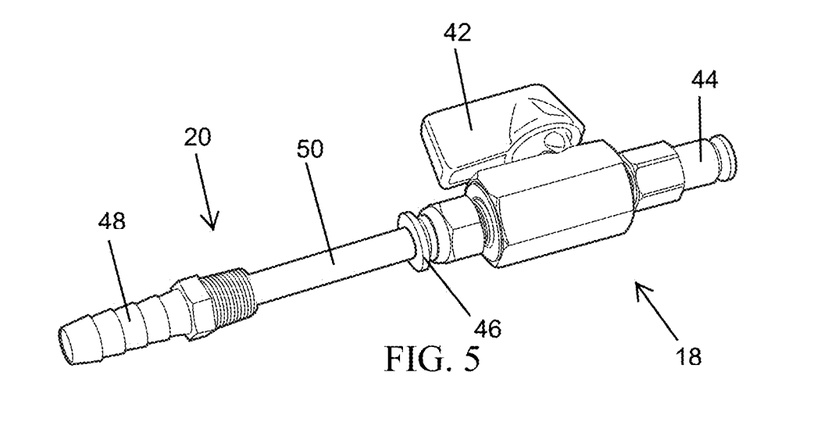
FIG. 5 is an enlarged upper perspective view of a feeder tube attached at the valve assembly of the tree injection apparatus shown in FIG. 1.

The distal ends of the flexible conduit 16 and the additional sections of tubing 40a, 40b 40c may each be attached to a valve assembly 18 that also acts as an adapter or connector for attaching the feeder tube 20. As shown in FIG. 4, the valve assembly 18 has an open position (shown) and a closed position, which is selected or controlled by a control arm 42. The valve assembly 18 may be used to purge air from the flexible conduit 16 prior to releasing the pressurized treatment solution to the tree, via the feeder tube 20. The opposing ends of the valve assembly 18 each include a linear connector 44, 46, such as releasable connector or push-to-connect pneumatic fitting, where the upstream connector 44 is configured to releasably engage the flexible conduit 16 at one end and the downstream connector 46 is configured to releasably engage the feeder tube 20 at the other end. As shown in FIG. 5, the feeder tube 20 is engaged at the connector 46 of the valve assembly 18. Accordingly, with such a linear configuration, the valve assembly 18 and feeder tube 20 cooperate to form a substantially linear interior passage that is well adapted, when the valve assembly 18 is in the open position, to be easily mechanically cleaned of debris, pathogens, and spores, such as with a wire or a pipe-cleaner type brush or similar mechanical cleaning tool.

Figure 6:
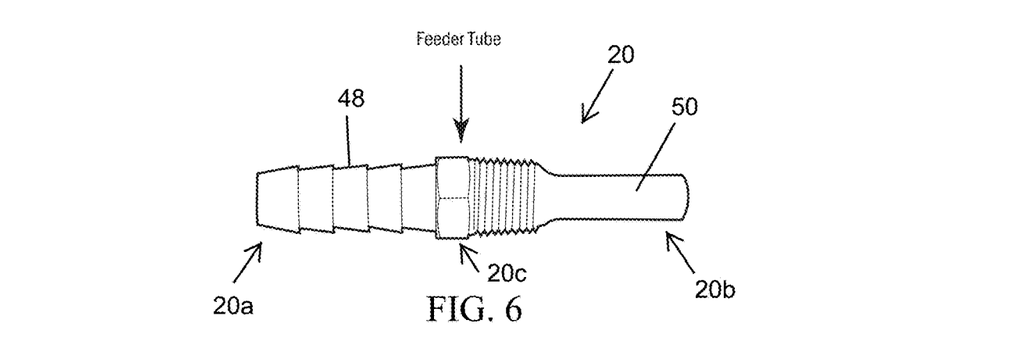
FIG. 6 is an enlarged elevational view of a section of the feeder tube shown in FIG. 1.
Figure 6A:
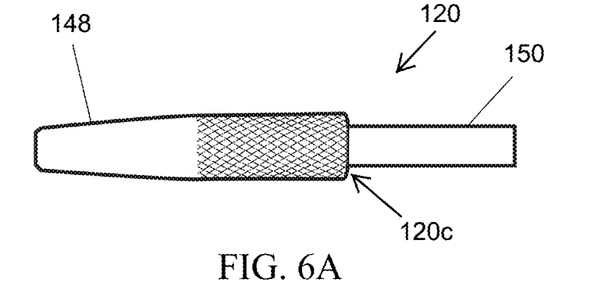
FIG. 6A is an elevational view of another feeder tube having a tapered tip, for use with the tree injection apparatus of FIG. 1.
Figure 6B:
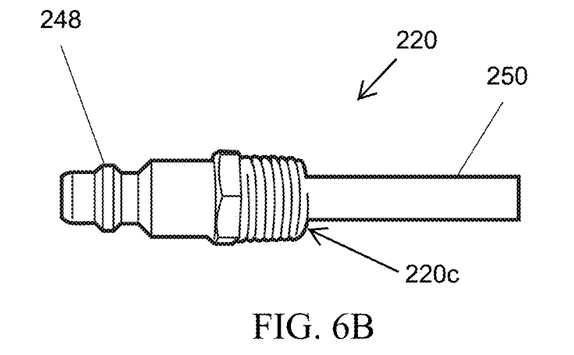
FIG. 6B is an elevational view of another feeder tube having a single-rib tip, for use with the tree injection apparatus of FIG. 1.
Figure 6C:
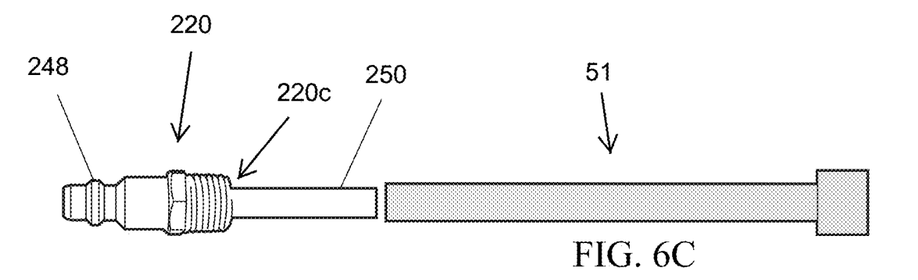
FIGS. 6C and 6D are elevational views of the feeder tube of FIG. 6B demonstrating the use of a pipe to insert the feeder tube into a bore.
Figure 6D:
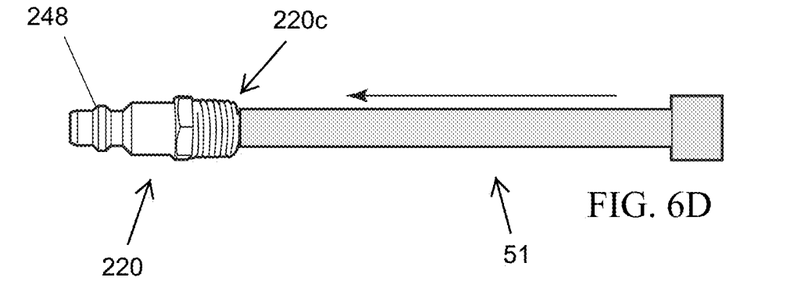

As shown in FIGS. 5 and 6, the feeder tube 20 includes a first end portion 20a that has a ribbed or barbed exterior surface 48 that is configured to be inserted into a hole drilled into a tree, such that the ribs or barbed edges engage the fibers of the tree. Optionally, instead of a ribbed or barbed exterior surface, a feeder tube 120 may have a smooth tapered exterior surface 148 (FIG. 6A) or another feeder tube 220 may have a single-ribbed exterior surface 248 resembling a male quick-connect pneumatic coupling (FIGS. 6B-6D). Referring once again to FIGS. 5 and 6, the opposing second end portion 20b of the feeder tube has a substantially smooth exterior surface 50 with a smaller diameter than the first end portion 20a for engaging the valve assembly 18. The diameter of the feeder tube 20 at the first end portion 20a is sized to prevent damage to a tree, as an overly large diameter can require drilled holes that damage the tree, while a diameter that is too small can easily clog with debris and be ineffective in delivering treatment solution to the tree. Preferably the diameter of the feeder tube 20 at the first end portion 20a is less than about ⅜ inch, and more preferably between about 5/16 inch and about 3/16 inch. For example, a hole drilled with a ¼ inch diameter drill bit will generally accommodate a 5/16 inch feeder tube. Further, the feeder tube 20 may comprise a metal material, such as brass.

The feeder tube 20 may also include a transition portion 20c, such as shown in FIGS. 6 and 10, between the opposing ends 20a, 20b that protrudes radially from the diameters of the opposing end portions 20a, 20b. The transition portion 20c may provide a structure that can be used to hammer, such as via a mallet, the feeder tube into the tree, such as by providing tube or pipe 51 (FIGS. 6C and 6D) that fits over the exposed end portion 20b and contacts the transition portion 20c, and thereby allowing the installer to hammer the tube or pipe to insert the feeder tube 20 into the drilled hole 52 (FIGS. 9 and 10) without damaging the upstream end 20b that attaches to the valve assembly 18. As shown in FIG. 10, the feeder tubes 20 are preferably installed without contacting the bottom of the drilled hole or bore 52, so as to prevent clogging the tube, but are driven sufficiently far enough into the hole or bore 52 to provide a seal between the wood and the feeder tube. It is preferred that the feeder tube 20 is inserted into the holes 52 immediately or at least as soon as practicable after the holes are drilled, so as to not allow the holes to remain open and exposed for a prolonged period of time.

Figure 9:
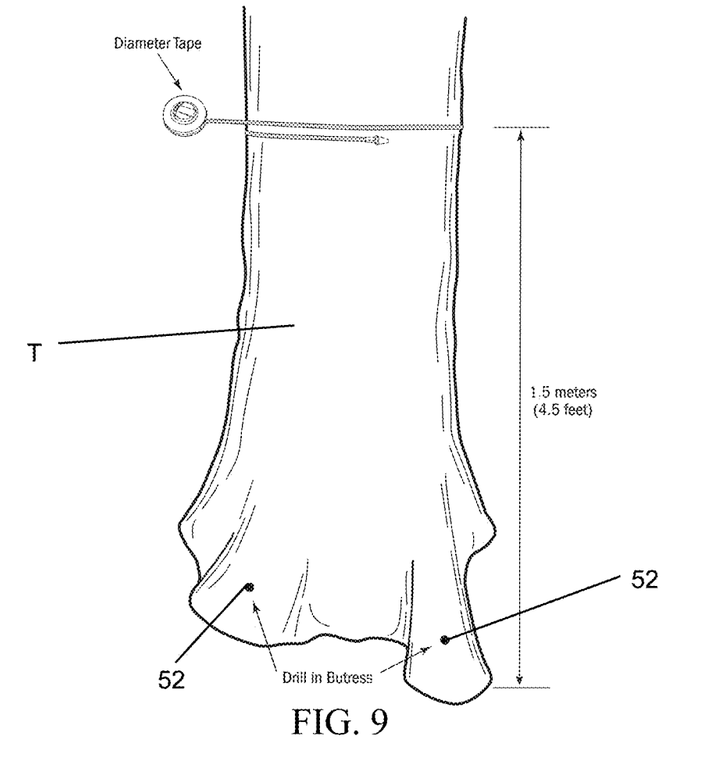
FIG. 9 is an elevational view of a tree having holes drilled in its buttress roots.

As shown in FIGS. 9 and 10, the holes 52 are drilled into the tree T at the root buttress flares formed by the roots at the base of the tree trunk, which generally provides adequate absorption of the treatment solution. The holes 52 may be drilled through the bark and about 1 inch into the wood fiber, and preferably downward at a slight angle. For determining the proper dosage, the tree trunk diameter may be used, such as by measuring trunk circumference and/or diameter at a height level that is about 1.5 meters above grade, such as shown in FIG. 9. Once the dosage is determined, the holes 52 are drilled, and the feeder tubes 20 are installed into the holes, the valve assemblies 18 can be attached to the feeder tubes 20 to setup the injection apparatus 10 to begin treatment of the tree T, such as shown in FIG. 11. When a sufficient dosage of liquid has been absorbed by the tree, the valves can be closed as the tubing empties of liquid. After all valves have been closed and a few minutes have elapsed to allow for any pressurized liquid still in the feeder tube to absorb into tree, the valve assemblies may be removed from the respective feeder tubes. The feeder tubes may then be removed from the tree by gripping with pliers and pulling out of the tree. The holes may then be sealed with an appropriate wound dressing immediately upon removal of the feeder tube, such as to prevent the spread of oak wilt fungi by sap-feeding beetles.

Figure 12:
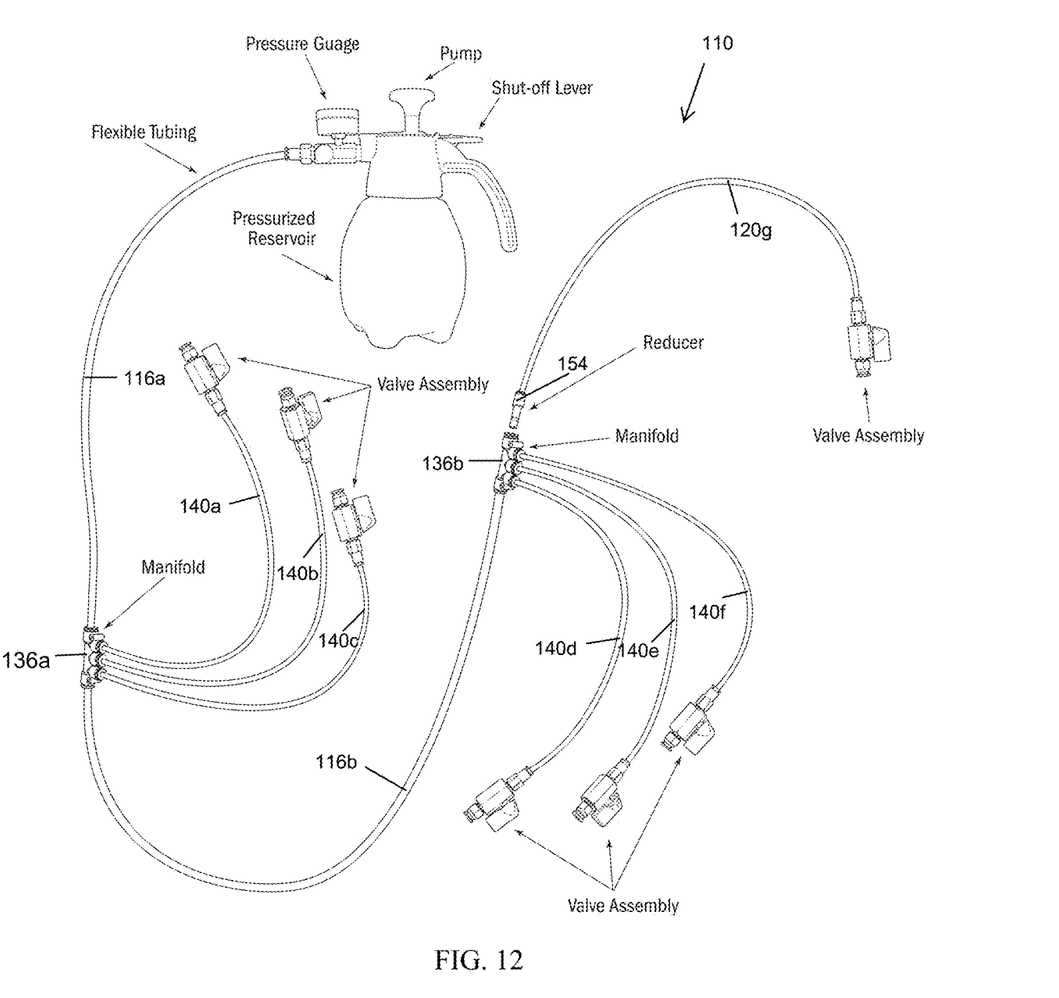
FIG. 12 is a perspective view of an additional embodiment of the tree injection apparatus that is expanded to provide an additional manifold and additional valve assemblies for treating a tree with a larger diameter.

Further, as shown in FIG. 12, the injection apparatus 110 is adapted by adding an additional manifold 136b at the end of the second or downstream section 116b of the flexible conduit, such that three additional sections of tubing 140d, 140e, 140f are provided in addition to the three sections of tubing 140a, 140b, 140c that are attached at the first manifold 136a, which connects to the first or upstream section 116a of the flexible conduit. Further, the additional manifold 136b attaches to a reducer 154 that allows the attachment of another section of tubing 120g with a small diameter than the flexible conduit 116a, 116b. With the arrangement of tubing provided by the injection apparatus 110 shown in FIG. 12, the injection apparatus 110 is capable of attaching to additional holes drilled into a tree, such as may be the case for larger diameter trees. It is also contemplated that such an arrangement may be used to treat two separate, nearby trees, or may be further expanded to accommodate yet even larger trees and/or additional nearby trees.

A corresponding method of treating a tree is also provided, in which a plurality of holes are drilled in spaced locations around the base of the tree, such as in the exposed roots or buttress roots. A feeder tube may be engaged or inserted into each of the plurality of drilled holes, such as by hammering the feeder tube into the holes as described above, to extend into vascular tissue of the tree. A desired pressure is generated in a fluid reservoir containing a liquid treatment solution with the use of a pump device coupled with the fluid reservoir. The pressurized treatment solution is released from the fluid reservoir to a flexible conduit that extends to a valve assembly attached at each of the feeder tubes. Prior to releasing the pressurized treatment solution through the feeder tube to the vascular tissue of the tree, air may be released or bled from the flexible conduit, such as at the valve assembly, to generally prevent air from being injected into the tree, which can be harmful and cause damage to the tree. Also, before engaging the feeder tubes in another tree, a substantially linear interior channel or fluid path of the feeder tube and valve assemblies may be exposed to be cleaned of debris, pathogens, and spores. Also, the tubing and feeder tubes can be placed in a disinfectant solution, such as alcohol or peroxide, to keep them clean of disease or fungus and plant sap until the next use. And further, the reservoir can be rinsed with clean water and the water flushed through the system.

For purposes of this disclosure, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An injection apparatus for treating trees, said injection apparatus comprising:
   a fluid reservoir adapted to contain an injectable treatment fluid;
   a pump coupled to the fluid reservoir, wherein the pump is operable to increase a fluid pressure of the treatment fluid;
   a fluid conduit having a first end coupled with the pump and a second end coupled with a valve assembly;
   a feeder tube releasably engaged at the valve assembly and configured to engage a bore formed in vascular tissue of a tree, wherein the feeder tube and the valve assembly cooperate to form a substantially linear fluid path when the valve assembly is in an open position;
   a manifold disposed at an intermediate section of the fluid conduit, the manifold having at least one connection port for engaging an additional fluid conduit that is configured to extend to another feeder tube and an additional drilled hole in the tree;
   wherein the pump is operable to convey the pressurized treatment solution to the fluid conduit and to the feeder tube at a desired pressure; and
   wherein when the fluid conduit is separated from the valve assembly, the substantially linear fluid path is adapted to be mechanically cleaned of debris, pathogens, and spores.

2. The injection apparatus of claim 1, wherein the pump comprises a pressure gauge that is adapted to provide a reading of the fluid pressure within the fluid reservoir.

3. The injection apparatus of claim 2, further comprising a second valve positioned between the pressure gauge and the fluid conduit, wherein said second valve is operable to selectively close off the fluid conduit from the fluid reservoir.

4. The injection apparatus of claim 1, wherein the pump is operable to increase the fluid pressure of the treatment fluid in the fluid reservoir.

5. The injection apparatus of claim 4, further comprising a fluid pressure regulator that is configured to limit the fluid pressure of the treatment fluid in the fluid conduit.

6. The injection apparatus of claim 4, wherein the pump includes a reservoir valve having a manually actuatable lever that is operable to open the reservoir valve for releasing the pressurized treatment solution to the fluid conduit.

7. The injection apparatus of claim 6, wherein the lever is configured to be held in a locked position with the reservoir valve open.

8. The injection apparatus of claim 1, wherein the feeder tube includes a first end portion with a ribbed exterior surface configured to engage the drilled hole of the tree and an opposing second end portion with a smooth exterior surface for engaging the valve assembly.

9. The injection apparatus of claim 1, wherein the valve assembly is operable to release air in the fluid conduit prior to releasing the pressurized treatment solution to the tree.

10. The injection apparatus of claim 1, wherein the valve assembly comprises a linear quick-release connector that is configured to releasably engage the feeder tube, and wherein the linear quick-release connector cooperates with the feeder tube and the valve assembly to further define the substantially linear fluid path that is configured to be mechanically cleaned of debris, pathogens, and spores.

11. An injection apparatus for treating trees, said injection apparatus comprising:
    a fluid reservoir adapted to contain an injectable treatment fluid;
    a pump coupled to the fluid reservoir, wherein the pump is operable to increase a fluid pressure of the treatment fluid in the fluid reservoir;
    a pressure gauge that is adapted to provide a reading of the fluid pressure within the fluid reservoir;
    an upstream fluid conduit having a first end coupled with the pump and a second end coupled with a manifold;
    at least two downstream fluid conduits in fluid communication with the upstream fluid conduit via a manifold having at least two connection ports for engaging the at least two downstream fluid conduits;
    a valve assembly in fluid communication with each of the at least two downstream fluid conduits; and
    a feeder tube releasably engaged at each of the valve assemblies and configured to engage a respective bore formed in vascular tissue of a tree;
    wherein the pump is operable to convey the pressurized treatment solution to the upstream and downstream fluid conduits and to the feeder tubes at a desired pressure.

12. The injection apparatus of claim 11, wherein the feeder tubes and the valve assemblies cooperate to form substantially linear fluid paths when the valve assemblies are open, wherein when the downstream fluid conduits are separated from the valve assemblies, the substantially linear fluid paths are adapted to be mechanically cleaned of debris, pathogens, and spores.

13. A method of treating a tree, said method comprising:
    drilling a plurality of bores in exposed roots of the tree;
    engaging a respective feeder tube into each of the plurality of bores to extend into vascular tissue of the tree;

at least partially filling a fluid reservoir with a liquid treatment solution;

pressurizing the liquid treatment solution with a pump coupled to the fluid reservoir;

releasing the pressurized liquid treatment solution from the fluid reservoir to a plurality of downstream fluid conduits that extend to respective valve assemblies in fluid communication with respective ones of the feeder tubes;

positioning an upstream fluid conduit disposed between the pump and the downstream fluid conduits;

receiving the pressurized liquid treatment solution from the upstream fluid conduit at a manifold, wherein said releasing the pressurized liquid treatment solution comprises conveying the pressurized liquid treatment solution to the downstream fluid conduits via the manifold; and releasing air from the fluid conduit at the valve assembly prior to releasing the pressurized treatment solution through the feeder tubes to the vascular tissue of the tree.

14. The method of claim 13, wherein the feeder tubes and the valve assemblies cooperate to form respective substantially linear fluid paths when the valve assemblies are open, said method further comprising:

separating a first of the fluid conduits from a respective first of the valve assemblies;

disengaging a respective first of the feeder tubes from the vascular tissue of the tree;

opening the first valve assembly; and cleaning the substantially linear fluid path with a mechanical cleaning tool.

15. The method of claim 13, wherein the valve assemblies comprises respective linear quick-release connectors that are configured to releasably engage the respective feeder tubes, and wherein the linear quick-release connectors cooperate with the feeder tubes and the valve assemblies to further define the substantially linear fluid paths.

16. The method of claim 13, wherein the pressurizing the liquid treatment solution comprises pressurizing the fluid reservoir with the pump.

17. The method of claim 16, wherein the pressurizing the liquid treatment solution comprises pressurizing the fluid reservoir to a desired pressure while monitoring a fluid pressure gauge that is configured to display the fluid pressure in the fluid reservoir.

18. The method of claim 17, further comprising regulating the fluid pressure of the liquid treatment solution in the plurality of fluid conduits.

* * * * *